United States Patent
Morishita

(10) Patent No.: US 7,246,021 B2
(45) Date of Patent: Jul. 17, 2007

(54) AUTOMATIC FRONT LIGHT OPTICAL AXIS DIRECTION ADJUSTING SYSTEM FOR VEHICLES

(75) Inventor: Masahiko Morishita, Toyoake (JP)

(73) Assignee: DENSO Corporation, Kariya, Aichi-pref. (JP)

(*) Notice: Subject to any disclaimer, the term of this patent is extended or adjusted under 35 U.S.C. 154(b) by 0 days.

(21) Appl. No.: 11/200,183

(22) Filed: Aug. 10, 2005

(65) Prior Publication Data
US 2006/0044783 A1 Mar. 2, 2006

(30) Foreign Application Priority Data
Aug. 27, 2004 (JP) .............................. 2004-248484

(51) Int. Cl.
*B60Q 1/00* (2006.01)
*G06F 15/00* (2006.01)

(52) U.S. Cl. ......................... 702/95; 702/94; 702/151; 702/189; 702/197; 362/465; 362/466; 362/42; 362/43; 362/44; 362/46; 362/49

(58) Field of Classification Search .................. 702/95, 702/151; 362/464–466, 37
See application file for complete search history.

(56) References Cited

U.S. PATENT DOCUMENTS

| 6,671,640 | B2 | 12/2003 | Okuchi et al. |
| 6,984,059 | B2* | 1/2006 | Ishiguro et al. ............. 362/465 |
| 2002/0036901 | A1* | 3/2002 | Horii et al. .................... 362/37 |

* cited by examiner

*Primary Examiner*—John Barlow
*Assistant Examiner*—Sujoy Kundu
(74) *Attorney, Agent, or Firm*—Nixon & Vanderhye P.C.

(57) ABSTRACT

The directions of optical axes of headlights of a vehicle are adjusted based on a steering angle by switching filters of different response speed characteristics. The filters are provided with hystereses along boundaries neighboring to each other. The filters are switched depending upon the steering angle and a steering angular velocity to vary the response of swivel control. Therefore, the start of swiveling is not quickened, the filter is not frequently switched, quick motion is suppressed and, hence, smooth motion is realized making it possible to execute a swivel control without causing discomfort.

12 Claims, 5 Drawing Sheets

AUTOMATIC FRONT LIGHT OPTICAL AXIS DIRECTION ADJUSTING SYSTEM FOR VEHICLES

CROSS REFERENCE TO RELATED APPLICATION

This application is based on and incorporates herein by reference Japanese Patent Application No. 2004-248484 filed on Aug. 27, 2004.

FIELD OF THE INVENTION

The present invention relates to a system for automatically adjusting directions of optical axes of front lights for vehicles depending upon the steering angle of a steering wheel.

BACKGROUND OF THE INVENTION

A system for automatically adjusting directions of optical axes of front lights for vehicles is disclosed in U.S. Pat. No. 6,671,640 (JP-A-2002-178829). This system is for changing the response in the swivel control relying upon the angular velocity (change speed) of the steering angle of a steering wheel as a steering operation parameter at the time of swivel-controlling the directions of optical axes of the front lights in the right-and-left direction depending upon the steering of the steering wheel.

This system varies the response by switching filters. However, a sharp swivel control based on a frequent switching of the filters gives discomfort to drivers. Further, when the steering wheel is slowly turned from the neutral position, the swivel control starts in a delayed manner giving discomfort to the driver.

SUMMARY OF THE INVENTION

The present invention has therefore an object to provide a system for automatically adjusting the directions of optical axes of front lights for vehicles, which varies the response by switching filters depending upon the operation of a steering wheel not to give discomfort to drivers at the time of swivel-controlling the directions of optical axes of the front lights.

According to the present invention, a system for automatically adjusting directions of optical axes of front lights for a vehicle detects a steering angle of a steering wheel, adjusts a direction of an optical axis of the front light in response to the detected steering angle by switching filters. The system changes a response of the swivel control based on at least one of the detected steering angle and a steering angular velocity, that is, a change speed of the steering angle, as a steering operation parameter when the direction of optical axis of the front light is to be swiveled by switching the filters. The filters have hystereses along boundaries neighboring each other to restrict frequent switching of the filters.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EMBODIMENT

Figure 1:
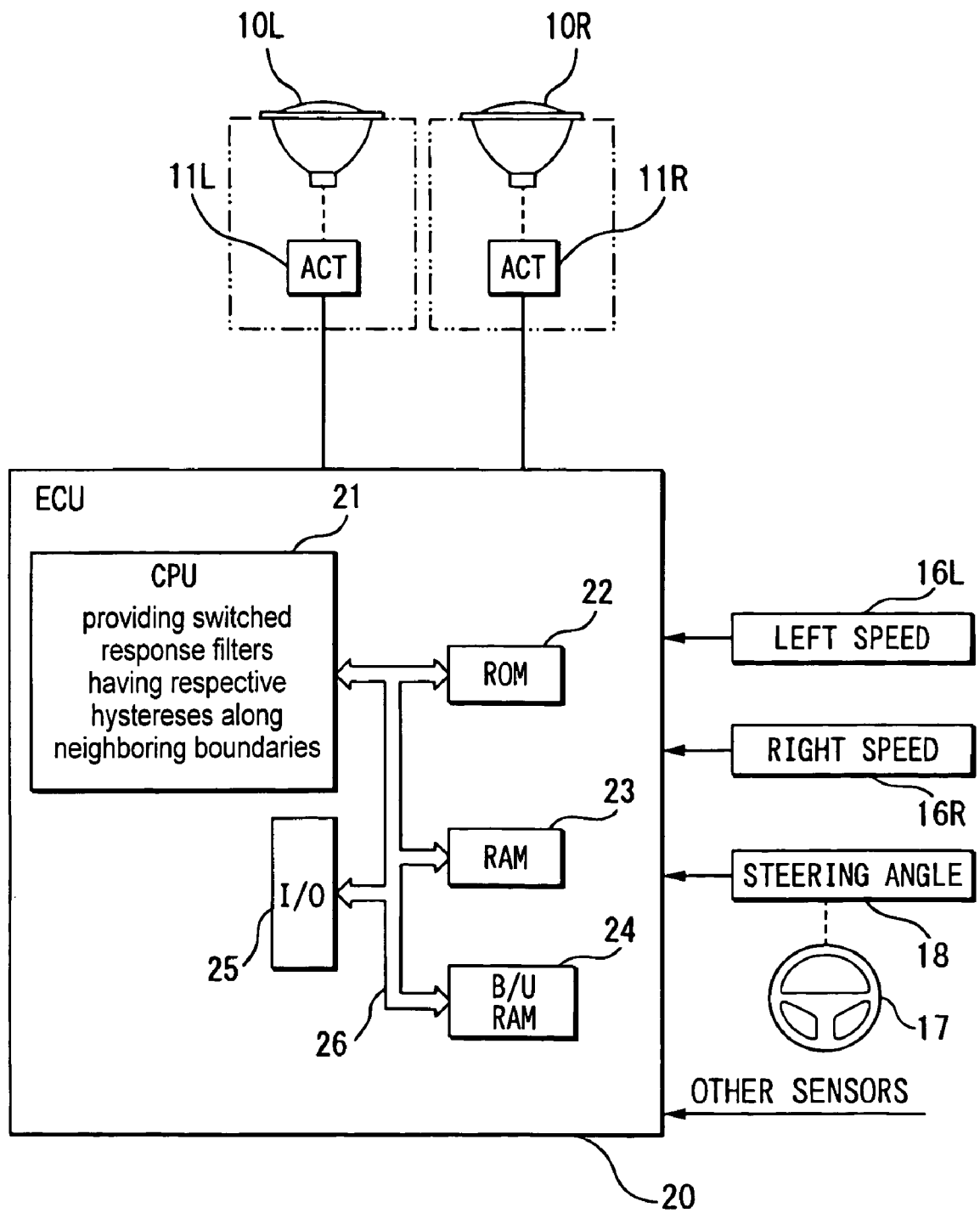
FIG. 1 is a block diagram illustrating a system for automatically adjusting directions of optical axes of front lights for vehicles according to an embodiment of the invention.

Referring to FIG. 1, right and left headlights 10R and 10L are arranged as front lights on the front of a vehicle. Actuators 11R and 11L are connected to the headlights 10R and 10L to adjust the directions of optical axes in the right-and-left direction. An electronic control unit (ECU) 20 is constructed as a logic operation circuit including a CPU 21, a ROM 22 storing a control program and a control data, a RAM temporarily storing various data, a back-up (B/U) RAM 24, an input/output (I/O) circuit 25, and a bus line 26 for connecting them.

The ECU 20 receives an output signal from a left wheel speed sensor 16L that detects the left wheel speed VL of the left wheel of the vehicle, an output signal from a right wheel speed sensor 16R that detects the right wheel speed VR of the right wheel of the vehicle, an output signal from a steering angle sensor 18 that detects the steering angle STA of a steering wheel 17 operated by a driver, and various other sensor signals.

Output signals of the ECU 20 are input to the actuators 11R and 11L of the right and left headlights 10R and 10L of the vehicle to adjust the directions of optical axes of the right and left headlights 10R and 10L.

Figure 2:
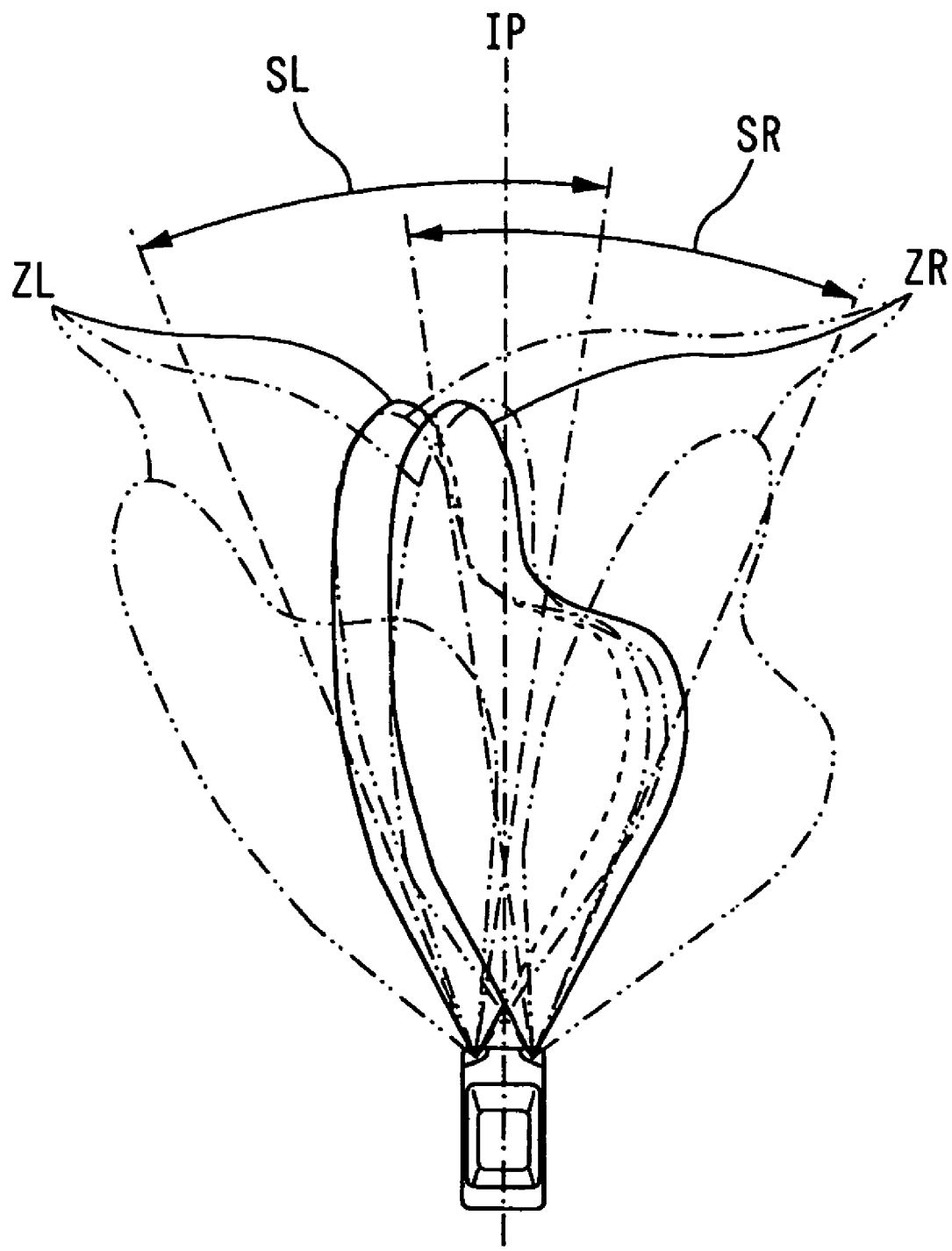
FIG. 2 is a schematic view illustrating illuminating zones of headlights in the embodiment of the invention.

The ECU 20 is constructed to adjust, as shown in FIG. 2, the illuminating zones (low beams) ZR and ZL of the right and left headlights 10R and 10L within swivel control ranges SR or SL toward the right or toward the left from the initial position IP depending upon the steering operation of the steering wheel 17 toward the right or the left from the neutral position. The swivel control range must be such that the forward visibility of the driver is not impaired, and the visibility is accomplished toward the right or the left depending upon the driver's operation of the steering wheel 17.

When turning to the left by operating the steering wheel 17 of the vehicle, therefore, the swivel control range SL of the headlight 10L in the left direction for the illuminating zone 10L of the headlight 10L is more broadened than the swivel control range SR of the headlight 10R in the right direction for the illuminating zone ZR of the headlight 10R. Conversely, when turning to the right by operating the steering wheel 17 of the vehicle, the swivel control range SR of the headlight 10R in the right direction for the illuminating zone ZR of the headlight 10R is more broadened than the swivel control range SL of the headlight 10L in the left direction for the illuminating zone ZL of the headlight 10L.

Figure 3:
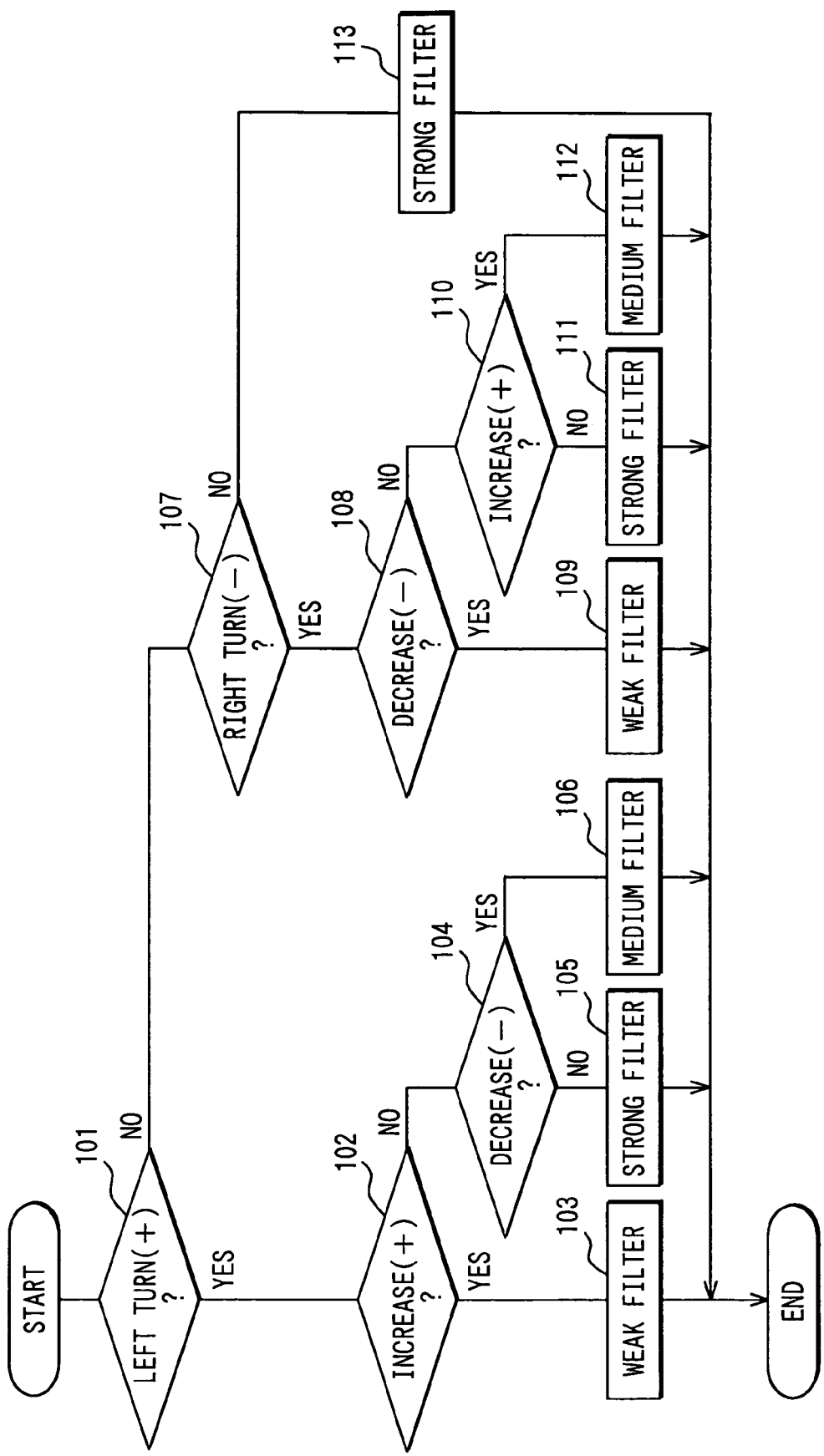
FIG. 3 is a flowchart illustrating a procedure for selecting filters used in the embodiment of the invention.

For the above operation, the CPU 21 of the ECU 20 is programmed to select filters of different filtering characteristics and hence different response characteristics by executing a routine shown in FIG. 3. The routine for selecting filters is repetitively executed by the CPU 21 at regular intervals.

Figure 4:
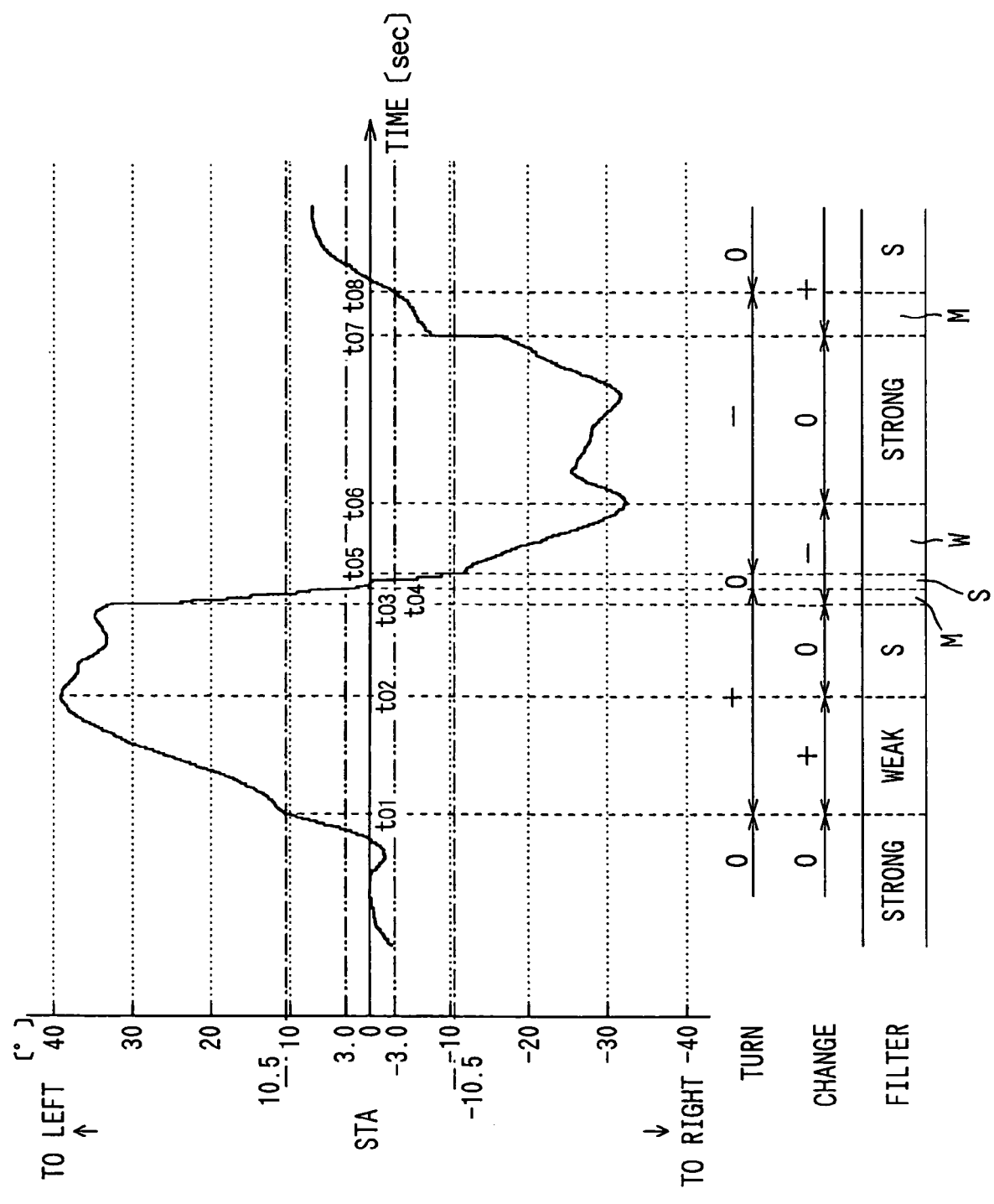
FIG. 4 is a timing diagram illustrating selection of filters in the embodiment of the invention.

The selection of filters is attained as shown in FIG. 4, for example. The filters are selected based on the determination of increase/decrease and on the determination of turn which is based on the transition in the amount of change in the steering angle STA° and in the amount of change in the steering angular velocity DSTA°/sec which is the amount of change in the steering angle per a unit time of 1 sec corresponding to the processing of FIG. 3. A weak filter eliminates very little high-frequency components and hence provides a quick or less-smoothed response characteristic of the swivel control (optical axis control) relative to a steering operation. A strong filter eliminates high-frequency components very much and hence provides a slow, delayed or very smoothed response characteristic.

In FIG. 4, the steering operation of the steering wheel 17 in the left direction is denoted with the positive sign (+) and the steering operation in the right direction is denoted with the negative sign (−). Further, for the steering angular velocity DSTA, the increase in the left direction is denoted with the positive sign (+) and the increase in the right direction is denoted by the negative sign (−). At a moment before a time t01 in FIG. 4, the amount of change in the steering angle STA is determined to be 0 (zero: traveling straight), and a strong filter (S) is selected.

In FIG. 3, first, it is determined at step 101 whether the vehicle is turning to the left (+) based on the amount of change in the steering angle STA, which is used as a steering operation parameter. When it is determined that the steering angle STA of the steering wheel 17 is in a range of 0 to 20.0° or, more preferably, the steering angle STA is not smaller than 10.5° in a range of 7.5 to 12.5° and that the vehicle is turning to the left (time t01 in FIG. 4), the routine proceeds to step 102. Here, the hysteresis is so set that the determination of turning to the left is maintained up to a time t04 in FIG. 4 at which the steering angle STA becomes smaller than the previous value in a range of −20.0 to 20.0° or, more preferably, until the steering angle STA becomes not larger than, for example, 3.0° in a range of 0 to 6.0°.

At step 102, the amount of change in the steering angular velocity DSTA is determined whether it is increasing (+). When the steering angular velocity DSTA, which is also used as a steering operation parameter, is in a range of 0 to 60.0°/sec or, more preferably, the steering angle STA is not smaller than 20.0°/sec in a range of 10.0 to 30.0°/sec and that the steering angular velocity DSTA is increasing (time t01 in FIG. 4), the routine proceeds to step 103 where a weak filter is selected.

Here, the hysteresis is so set that the determination of increasing is maintained up to a time t02 in FIG. 4 at which the steering angular velocity DSTA becomes smaller than the previous value in a range of −60.0 to 60.0°/sec or, more preferably, until the steering angle STA becomes not larger than, for example, −10.0°/sec in a range of −20.0 to 0°/sec. According to the filter processing using the weak filter that is selected, the swivel control angle based on a target swivel angle that corresponds to the transition of the steering angle STA of the steering wheel 17 sensitively reacts to a fine variation in the steering angle STA.

On the other hand, when the steering angular velocity DSTA is smaller than 20.0°/sec, the routine proceeds to step 104 where it is determined whether the amount of change in the steering angular velocity DSTA is decreasing (−). When the steering angular velocity DSTA does not lie in a range of −60.0 to 0°/sec where it can be determined to be decreasing or, more preferably, is not smaller than, for example, −20.0°/sec in a range of −30.0 to −10.0°/sec and is determined to be neither increasing nor decreasing (time t02 to t03 in FIG. 4), the routine proceeds to step 105 where a strong filter is selected.

According to the filter processing using the strong filter that is selected, the swivel control angle based on a target swivel angle that corresponds to the transition of the steering angle STA of the steering wheel 17 is free from fine variation since high-frequency components of vibration have been removed from the steering angle STA.

On the other hand, when the steering angular velocity DSTA is smaller than −20.0°/sec (time t03 to time t04 in FIG. 4), the routine proceeds to step 106 where there is selected a medium filter having characteristic intermediate between the weak filter selected at step 103 and the strong filter selected at step 105.

Here, when the steering angle STA of the steering wheel 17 is smaller than 3.0° that is set by hysteresis after the determination rendered to be turning to the left, and is determined to be not turning to the left, the routine proceeds to step 107 where the determination is rendered whether it is turning to the right (−) based on the amount of change in the steering angle STA. When the steering angle STA of the steering wheel 17 does not lie in a range of −20.0 to 0° where it can be determined to be turning to the right based on its amount of change or, more preferably, is not smaller than, for example, −10.5° in a range of −12.5 to −7.5° and is determined to be traveling straight based on the amount of change in the steering angle STA (time t04 to time t05 in FIG. 4), the routine proceeds to step 113 where the strong filter is selected like at step 105.

On the other hand, when the steering angle STA of the steering wheel 17 is smaller than −10.5° and the determination is rendered to be turning to the right based on the amount of change in the steering angle STA (time t05 in FIG. 4), the routine proceeds to step 108. Here, the hysteresis is so set that the determination of turning to the right is maintained up to a time t08 in FIG. 4 at which the steering angle STA becomes greater than the previous value in a range of −20.0 to 20.0° or, more preferably, until the steering angle STA becomes not smaller than, for example, −3.0° in a range of −6.0 to 0°.

At step 108, the amount of change in the steering angular velocity DSTA is determined whether it is decreasing. When the steering angular velocity DSTA is smaller than −20.0°/sec and is determined to be decreasing (time t05 in FIG. 4), the routine proceeds to step 109 where the weak filter is selected like at step 103 to end the routine. Here, the hysteresis is so set that the determination of decreasing is maintained up to a time t06 in FIG. 4 at which the steering angular velocity DSTA becomes greater than the previous value in the range of −60.0 to 60.0°/sec or, more preferably, until the steering angular velocity DSTA becomes not smaller than, for example, 10.0° in a range of 0 to 20.0°/sec.

On the other hand, when the steering angular velocity DSTA is greater than −20.0°/sec, the routine proceeds to step 110 where it is determined whether the amount of change in the steering angular velocity DSTA is increasing. When the steering angular velocity DSTA is not greater than 20.0°/sec and is determined to be neither increasing nor decreasing (time t06 to time t07 in FIG. 4), the routine proceeds to step 111 where the strong filter is selected like at step 105.

On the other hand, when the steering angular velocity DSTA is not smaller than 20.0°/sec and the determination is rendered to be increasing (time t07 in FIG. 4), the routine proceeds to step 112 where the medium filter is selected like at step 106.

Here, the hysteresis is so set that the determination of increasing is maintained until the steering angular velocity DSTA becomes smaller than the previous value in the range of −60.0 to 60.0°/sec or, more preferably, until the steering angular velocity DSTA becomes not larger than, for example, −10.0°/sec in the range of −20.0 to 0°/sec. However, when the steering angle STA that is determined at step 107 to be turning to the right is not smaller than −3.0° due to the hysteresis (time t08 and onward in FIG. 4), the routine proceeds to step 113 where the amount of change in the steering angle STA is determined to be traveling straight to select the strong filter.

After steps 103, 105, 106, 109 and 111 to 113, the CPU 21 ends the above filter selecting processing. The ECU 20 controls the optical axes of the headlights 10R and 10L based on the selected filter.

Figure 5:
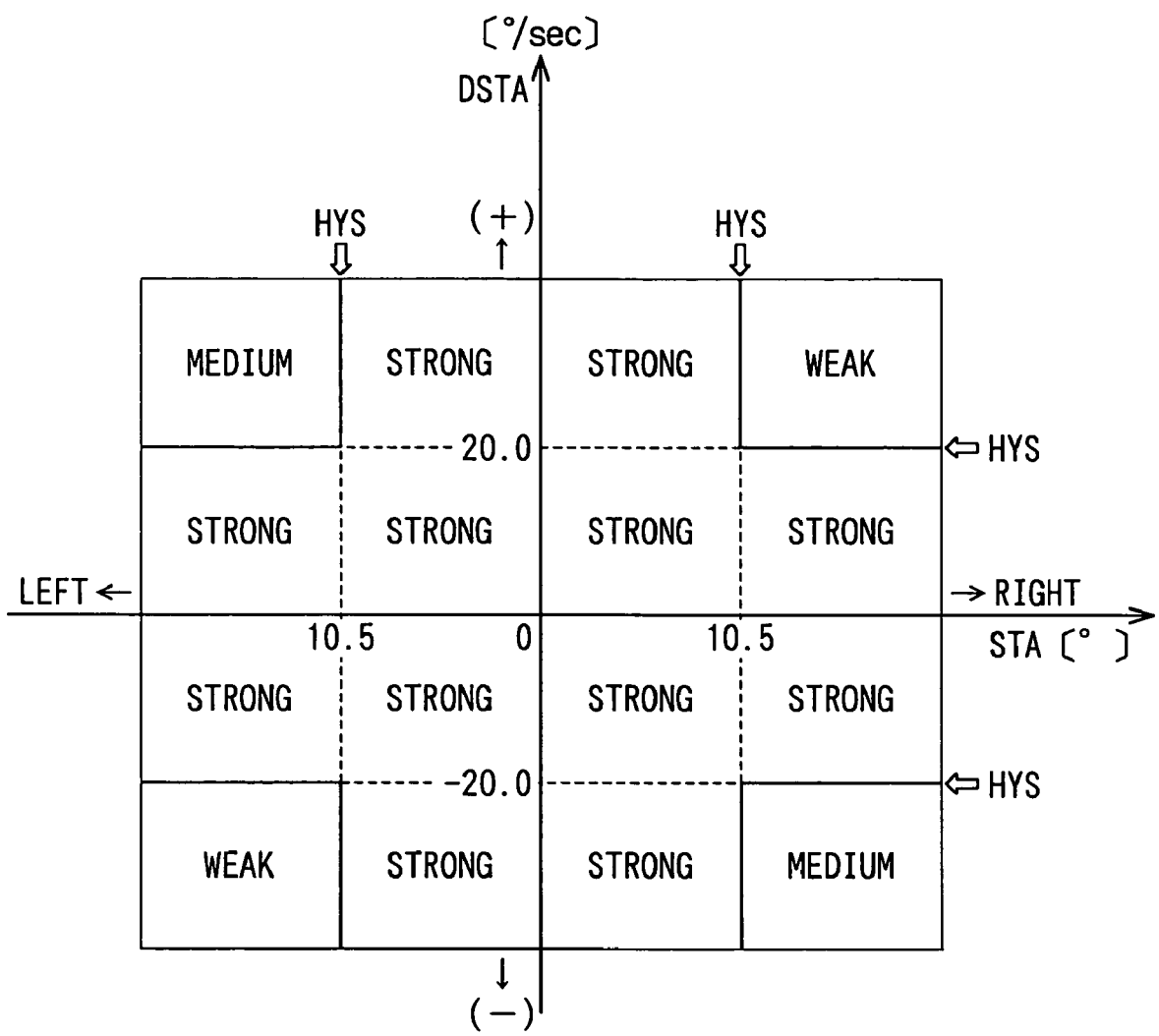
FIG. 5 is a diagram illustrating the filters to be selected and switched in the embodiment of the invention.

FIG. 5 is a diagram illustrating filters which are selectively switched depending upon the steering angle STA and the steering angular velocity DSTA by the above routine for selecting the filter. As shown by white arrows in FIG. 5, hystereses (HYS) are set along the boundaries of the neighboring filters, and the values at the boundaries are hysteresis values in a direction in which the absolute value of the steering angle STA or the steering angular velocity DSTA increases at the time of switching the filter.

As described above, the range in which the amount of change in the steering angle STA can be determined to be turning to the left must not be greater than 20.0° and where the steering angle STA is positive (+) without fluctuation and remarkably representing the turning. If swivel fluctuation and swivel reaction are taken into consideration, a suitable range is 7.5 to 12.5°.

Similarly, the range in which the amount of change in the steering angle STA can be determined to be turning to the right must not be smaller than −20.0° and where the steering angle STA is negative (−) without fluctuation and remarkably representing the turning. If swivel fluctuation and swivel reaction are taken into consideration, a suitable range is −12.5 to −7.5°.

As described above, further, the range in which the amount of change in the steering angular velocity DSTA can be determined to be increasing must not be greater than 60.0°/sec and where the steering angular velocity DSTA is positive (plus) without fluctuation and remarkably representing the increase. If swivel fluctuation and swivel reaction are taken into consideration, a suitable range is 10 to 30°/sec.

Similarly, the range in which the amount of change in the steering angular velocity DSTA can be determined to be decreasing must not be smaller than −60.0°/sec and where the steering angular velocity DSTA is negative (−) without fluctuation and vividly representing the decrease. If swivel fluctuation and swivel reaction are taken into consideration, a suitable range is −30 to −10°/sec.

According to this embodiment, the filters having hystereses along the boundaries neighboring to each other are switched depending upon the steering angle STA and the steering angular velocity DSTA of the steering wheel 17 detected by the steering angle sensor 18, to vary the response characteristic at the time of swiveling the directions of optical axes of the headlights 10R and 10L. The directions of optical axes of the headlights 10R and 10L are thus adjusted based on the swivel control angle that is obtained. This makes it possible to swivel-control the directions of optical axes of the headlights 10R and 10L without causing discomfort, suppressing quick start of swivel operation and without permitting the filters to be frequency switched following the steering operation of the steering wheel 17 by the driver and, hence, suppressing quick motion and maintaining smooth operation.

Further, the hystereses are so set that the vehicle is determined to be turning to the left from traveling straight when the steering angle STA is not smaller than 10.5° and, thereafter, the vehicle is determined to be traveling straight from turning to the left when the steering angle STA is not larger than 3.0° which is smaller than the previous value. The hystereses are so set that the vehicle is determined to be turning to the right from traveling straight when the steering angle STA is not greater than −10.5° and, thereafter, the vehicle is determined to be traveling straight from turning to the right when the steering angle STA is not smaller −3.0° which is greater than the previous value.

Further, the hystereses are so set that the steering angular velocity DSTA is determined to be increasing from neither increasing nor decreasing when it is not smaller than 20.0°/sec and, thereafter, the steering angular velocity DSTA is determined to be neither increasing nor decreasing from the increase when it is not larger than −10.0°/sec which is smaller than the previous value. The hystereses are so set that the steering angular velocity DSTA is determined to be decreasing from neither increasing nor decreasing when it is not greater than −20°/sec and, thereafter, the steering angular velocity DSTA is determined to be neither increasing nor decreasing from the decrease when it is not smaller than 10.0°/sec which is greater than the previous value.

In adjusting the directions of optical axes of head lights 10R and 10L depending upon the steering operation of the steering wheel 17 by the driver, the hystereses corresponding to the steering angle STA and the steering angular velocity DSTA are set along the boundaries where the three kinds of filters, strong filters, medium filters and weak filters, are neighboring to each other. Therefore, the filters are not frequently switched, quick motion is suppressed to a smooth motion, and a swivel control is accomplished without causing discomfort.

In the above embodiments, the filter is selected depending upon the steering angle STA and the steering angular velocity DSTA. However, the present invention is in no way limited thereto only, and the filter may be selected depending upon either the steering angle STA or the steering angular velocity DSTA. Further, even when the filters are provided to be switched based on the steering angle STA and the steering angular velocity DSTA, the hystereses may be provided for switching only in relation to one of the steering angle STA and the steering angular velocity DSTA.

What is claimed is:

1. A system for automatically adjusting directions of optical axes of front lights for a vehicle, said system comprising:

steering angle detecting means for detecting a steering angle of a steering wheel of the vehicle;

swivel control means for adjusting a direction of an optical axis of the front light in response to a steering operation parameter related to a detected steering angle; and response changing means for changing a response of the swivel control means relative to the steering operation parameter by switching between use of filters having different filtering characteristics, wherein the steering operation parameter is the detected steering angle, wherein the response changing means changes the response of the swivel control emans based on the detected steering angle when the direction of optical axis of the front light is to be swiveled by switching the filters, and wherein the filters have respective hystereses along boundaries neighboring each other.

2. The system according to claim 1, wherein:
the hystereses are so set that:
the vehicle is determined to be turning to left from traveling straight when the detected steering angle is more than a first predetermined value in a range of 0 to 20.0° and, thereafter, the vehicle is determined to be traveling straight from turning to left when the detected steering angle is less than a second predetermined value which is smaller than the first predetermined value in a range of −20.0 to 20.0°; and
the vehicle is determined to be turning to right from traveling straight when the detected steering angle is less than a third predetermined value in a range of −20 to 0° and, thereafter, the vehicle is determined to be traveling straight from turning to right when the detected steering angle is more than a fourth predetermined value which is greater than the third predetermined value in a range of −20.0 to 20.0°.

3. A system for automatically adjusting directions of optical axes of front lights for a vehicle, said system comprising:
steering angle detecting means for detecting a steering angle of a steering wheel of the vehicle;
swivel control means for adjusting a direction of an optical axis of the front light in response to a steering operation parameter related to a detected steering angle; and
response changing means for changing a response of the swivel control means relative to the detected steering angle by switching filters, the response changing means changing the response of the swivel control means based on a change speed of the detected steering angle as the steering operation parameter when the direction of optical axis of the front light is to be swiveled by switching the filters of different filtering characteristics,
wherein the filters have respective hystereses along boundaries neighboring each other.

4. The system according to claim 3, wherein the hystereses are so set that:
the change speed of the detected steering angle is determined to be increasing from neither increasing nor decreasing when it is more than a first predetermined value in a range of 0 to 60.0°/second and, thereafter, the change speed of the detected steering angle is determined to be neither increasing nor decreasing from the increase when it is less than a second predetermined value which is smaller than the first predetermined value in a range of −60.0 to 60.0°/second; and
the change speed of the detected steering angle is determined to be decreasing from neither increasing nor decreasing when it is less than a third predetermined value in a range of −60 to 0°/second and, thereafter, the change speed of the detected steering angle is determined to be neither increasing nor decreasing from the decrease when it is more than a fourth predetermined value which is greater than the third predetermined value in a range of −60.0 to 60.0°/second.

5. A system for automatically adjusting directions of optical axes of front lights for a vehicle, said system comprising:
steering angle detecting means for detecting a steering angle of a steering wheel of the vehicle;
swivel control means for adjusting a direction of an optical axis of the front light in response to a steering operation parameter related to a detected steering angle, the steering angle parameter including at least a change speed of the detected steering angle; and
response changing means for changing a response of the swivel control means relative to the detected steering angle by switching filters of different filtering characteristics,
wherein the response changing means changing the response of the swivel control means based on the detected steering angle in addition to the change speed of the detected steering angle when the direction of optical axis of the front light is to be swiveled by switching the filters, and
wherein the filters have hystereses along boundaries neighboring each other.

6. The system according to claim 5, wherein the hystereses are so set that:
the vehicle is determined to be turning to left from traveling straight when the detected steering angle is more than a first predetermined value in a range of 0 to 20.0° and, thereafter, the vehicle is determined to be traveling straight from turning to left when the detected steering angle is less than a second predetermined value which is smaller than the first predetermined value in a range of −20.0 to 20.0° and, thereafter, the vehicle is determined to be traveling straight from turning to left when the detected steering angle is less than a second predetermined value which is smaller than the first predetermined value in a range of −20.0 to 20.0°;
the vehicle is determined to be turning to right from traveling straight when the steering angle is less than a third predetermined value in a range of −20.0 to 0° and, thereafter, the vehicle is determined to be traveling straight from turning to right when the detected steering angle is more than a fourth predetermined value which is greater than the third predetermined value in a range of −20.0 to 20.0°;
the change speed of the detected steering angle is determined to be increasing from neither increasing nor decreasing when it is more than a fifth predetermined value in a range of 0 to 60.0°/second and, thereafter, the change speed of the detected steering angle is determined to be neither increasing nor decreasing from the increase when it is less than a sixth predetermined value which is smaller than the fifth predetermined value in a range of −60.0 to 60.0°/second; and
the change speed of the detected steering angle is determined to be decreasing from neither increasing nor decreasing when it is less than a seventh predetermined value in a range of −60 to 0°/second and, thereafter, the change speed of the detected steering angle is determined to be neither increasing nor decreasing from the decrease when it is more than an eighth predetermined value which is greater than the seventh predetermined value in a range of −60.0 to 60.0°/second.

7. A method for automatically adjusting directions of optical axes of front lights for a vehicle, said method comprising:
detecting a steering angle of a steering wheel of the vehicle;
adjusting a direction of an optical axis of the front light in response to the detected steering angle; and
changing a response of the adjustment relative to the detected steering angle by switching between use of filters having different filtering characteristics including respective hystereses along boundaries neighboring each other
wherein the optical axis of the front light is automatically adjusted using said different filtering characteristics.

8. A method as in claim 7 wherein the hystereses are so set that:
- the vehicle is determined to be turning to left from traveling straight when the detected steering angle is more than a first predetermined value in a range of 0 to 20.0° and, thereafter, the vehicle is determined to be traveling straight from turning to left when the detected steering angle is less than a second predetermined value which is smaller than the first predetermined value in a range of −20.0 to 20.0°; and
- the vehicle is determined to be turning to right from traveling straight when the detected steering angle is less than a third predetermined value in a range of −20 to 0° and, thereafter, the vehicle is determined to be traveling straight from turning to right when the detected steering angle is more than a fourth predetermined value which is greater than the third predetermined value in a range of −20.0 to 20.0°.

9. A method as in claim 7 wherein:
the response of the adjustment is based on a change speed of the detected steering angle.

10. A method as in claim 9 wherein the hystereses are so set that:
- the change speed of the detected steering angle is determined to be increasing from neither increasing nor decreasing when it is more than a first predetermined value in a range of 0 to 60.0°/second and, thereafter, the change speed of the detected steering angle is determined to be neither increasing nor decreasing from the increase when it is less than a second predetermined value which is smaller than the first predetermined value in a range of −60.0 to 60.0°/second; and
- the change speed of the detected steering angle is determined to be decreasing from neither increasing nor decreasing when it is less than a third predetermined value in a range of −60 to 0°/second and, thereafter, the change speed of the detected steering angle is determined to be neither increasing nor decreasing from the decrease when it is more than a fourth predetermined value which is greater than the third predetermined value in a range of −60.0 to 60.0°/second.

11. A method as in claim 7 wherein:
said step is also responsive to adjusting a direction of an optical axis of the change in speed of the detected steering angle; and
said changing of the response is based on both the detected steering angle and the change in speed of the detected steering angle.

12. A method as in claim 11 wherein the hystereses are so set that:
- the vehicle is determined to be turning to left from traveling straight when the detected steering angle is more than a first predetermined value in a range of 0 to 20.0° and, thereafter, the vehicle is determined to be traveling straight from turning to left when the detected steering angle is less than a second predetermined value which is smaller than the first predetermined value in a range of −20.0 to 20.0°;
- the vehicle is determined to be turning to right from traveling straight when the steering angle is less than a third predetermined value in a range of −20.0 to 0° and, thereafter, the vehicle is determined to be traveling straight from turning to right when the detected steering angle is more than a fourth predetermined value which is greater than the third predetermined value in a range of −20.0 to 20.0°;
- the change in speed of the detected steering angle is determined to be increasing from neither increasing nor decreasing when it is more than a fifth predetermined value in a range of 0 to 60.0°/second and, thereafter, the change speed of the detected steering angle is determined to be neither increasing nor decreasing from the increase when it is less than a sixth predetermined value which is smaller than the fifth predetermined value in a range of −60.0 to 60.0°/second; and
- the change in speed of the detected steering angle is determined to be decreasing from neither increasing nor decreasing when it is less than a seventh predetermined value in a range of −60 to 0°/second and, thereafter, the change speed of the detected steering angle is determined to be neither increasing nor decreasing from the decrease when it is more than an eighth predetermined value which is greater than the seventh predetermined value in a range of −60.0 to 60.0°/second.

* * * * *